United States Patent [19]
Hicks

[11] Patent Number: 5,275,473
[45] Date of Patent: Jan. 4, 1994

[54] SHOPPING CART WHEELS WITH POLYMERIC BEARING RACES

[76] Inventor: Jimmy L. Hicks, 15654 Olive Branch, La Mirada, Calif. 90638

[21] Appl. No.: 987,550

[22] Filed: Dec. 8, 1992

Related U.S. Application Data

[63] Continuation of Ser. No. 749,645, Aug. 26, 1991, abandoned.

[51] Int. Cl.⁵ ................................................ B60B 5/02
[52] U.S. Cl. .................................. 301/105.1; 301/64.7; 384/492
[58] Field of Search ............. 301/1, 64.7, 105.1, 301/124.1, 126, 131, 110.6; 384/492, 501, 504, 546

[56] References Cited

U.S. PATENT DOCUMENTS

| | | | |
|---|---|---|---|
| 2,863,701 | 12/1958 | Jones et al. | 301/63 PW X |
| 2,955,884 | 10/1960 | Marshall | 301/63 PW X |
| 3,583,511 | 6/1971 | Asberg | 180/259 X |
| 3,695,728 | 10/1972 | Haussels | 301/63 PW X |
| 4,113,328 | 9/1978 | Vander Meulen | 384/492 X |
| 4,606,657 | 8/1986 | Tanaka | 384/492 |
| 5,002,163 | 3/1991 | Kidd | 301/6.8 X |
| 5,058,867 | 10/1991 | Hadano et al. | 584/222 X |

FOREIGN PATENT DOCUMENTS

| | | | |
|---|---|---|---|
| 1434940 | 5/1976 | United Kingdom | 384/492 |
| 2110609 | 6/1983 | United Kingdom | 301/111 |

*Primary Examiner*—Russell D. Stormer
*Attorney, Agent, or Firm*—Edgar W. Averill, Jr.

[57] ABSTRACT

An improved shopping cart wheel which includes a hub which has bearing supporting cavities. The outer bearing is fabricated from a polymer, and the inner bearing is likewise fabricated from a polymer and has a cylindrical portion which extends into the center of the hub. This construction avoids the corrosion heretofore caused by cleaning solutions on the metal races.

5 Claims, 2 Drawing Sheets

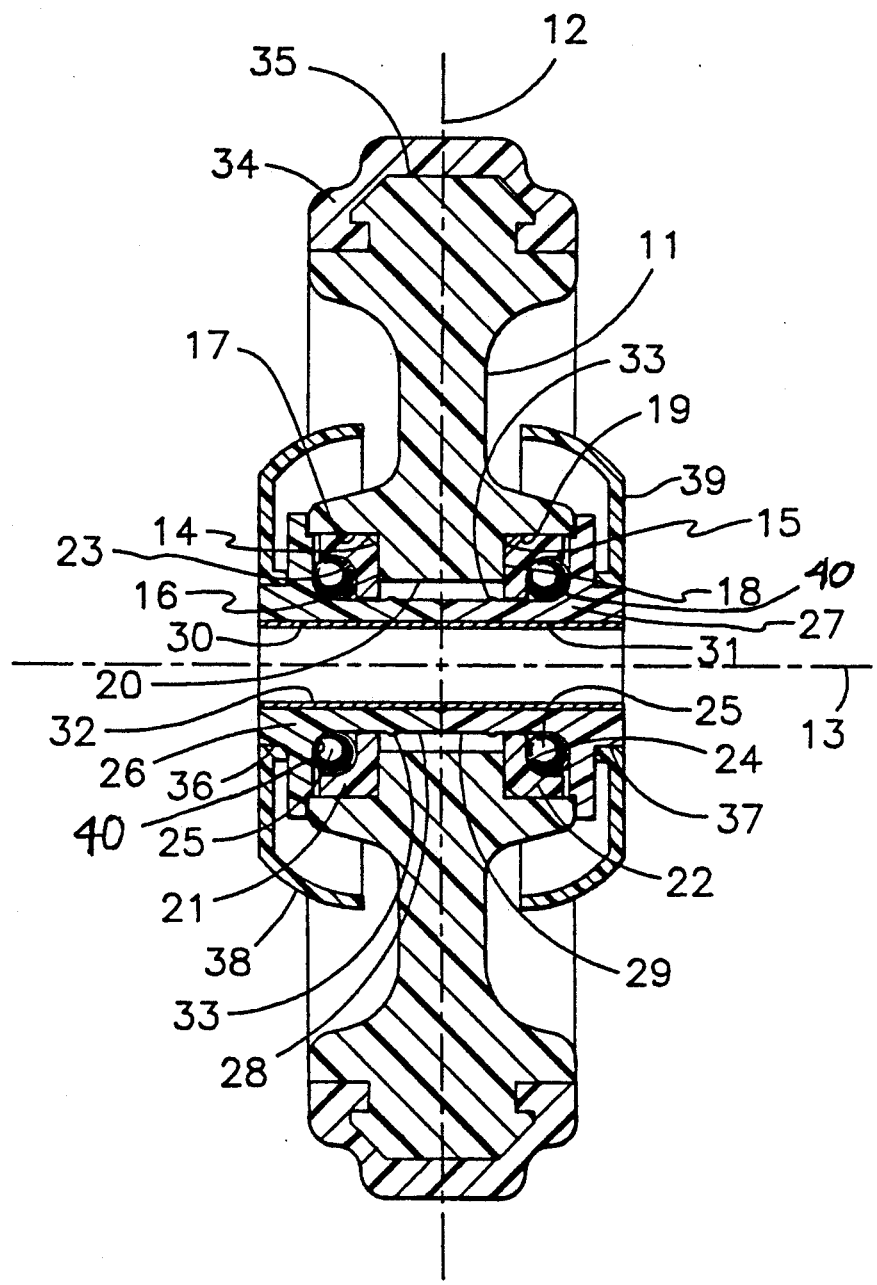

SHOPPING CART WHEELS WITH POLYMERIC BEARING RACES

This is a continuation of copending application Ser. No. 07/749,645 filed on Aug. 26, 1991, now abandoned.

BACKGROUND OF THE INVENTION

The field of the invention is casters and the invention relates more specifically to shopping cart wheels.

For more than twenty years, most high quality shopping cart wheels have utilized bearings which include a pair of all steel races and steel ball bearings. Such bearings are satisfactory for many uses but several trends exist which cause such bearings to be unsatisfactory. First, shopping carts are getting larger and are being used for heavier loads. Large hardware and wholesale outlets tend to lead to shoppers placing far more and far heavier goods in the shopping cart than was the case for the typical grocery shopper.

Another tendency is the use of high-pressure washing systems to clean shopping carts. The carts are periodically placed in the parking lot of the supermarket and high-pressure detergent streams are used to clean the carts but, unfortunately, such streams often wash grease from within the steel wheel bearings. This often results in a very noisy bearing which makes the cart totally unacceptable to the store customers and employees.

SUMMARY OF THE INVENTION

It is an object of the present invention to provide a shopping cart with bearings which are capable of withstanding heavy loads and which are not degraded by high-pressure Washing systems.

The present invention is for an improved shopping cart wheel of the type having a hub with a central axis of rotation, a central bisecting plane, and having an outer peripheral surface portion which supports a tire member. The hub also has a bearing support cavity surrounding the central axis of rotation. The improvement of the present invention comprises an opening surrounding the central axis of rotation about which first and second bearing supporting cavities are formed. A pair of female members are held by the first and second bearing support cavities, and the female race members are fabricated from a polymer, and each have an outwardly facing bearing race. A plurality of ball bearings are held adjacent the outwardly facing bearing race surfaces. A pair of male race members each has inwardly facing bearing races which are positioned facing the outwardly facing bearing race of the female race members. The male race members have an inner, generally cylindrical support cylinder which extends inwardly past the female race members to about the central bisecting plane of the hub and has a cylindrical inner surface. The bearing race extends away from the generally cylindrical support cylinder to form inwardly facing bearing races, and the male race member is also fabricated from a polymer. A cylindrical metallic inner shaft supporting sleeve supports the male race members along the cylindrical surface of the generally cylindrical support cylinder. Preferably, the female race member is fabricated from an acetal polymer, and the male race member is fabricated from nylon. There is also, preferably, a protrusion along the outer surface of the generally cylindrical support cylinder which holds the female race member in place after the ball bearings have been inserted.

BRIEF DESCRIPTION OF THE DRAWINGS

FIG. 2 is a cross-sectional view of the shopping cart wheel of FIG. 1.

DESCRIPTION OF THE PREFERRED EMBODIMENTS

Figure 1:
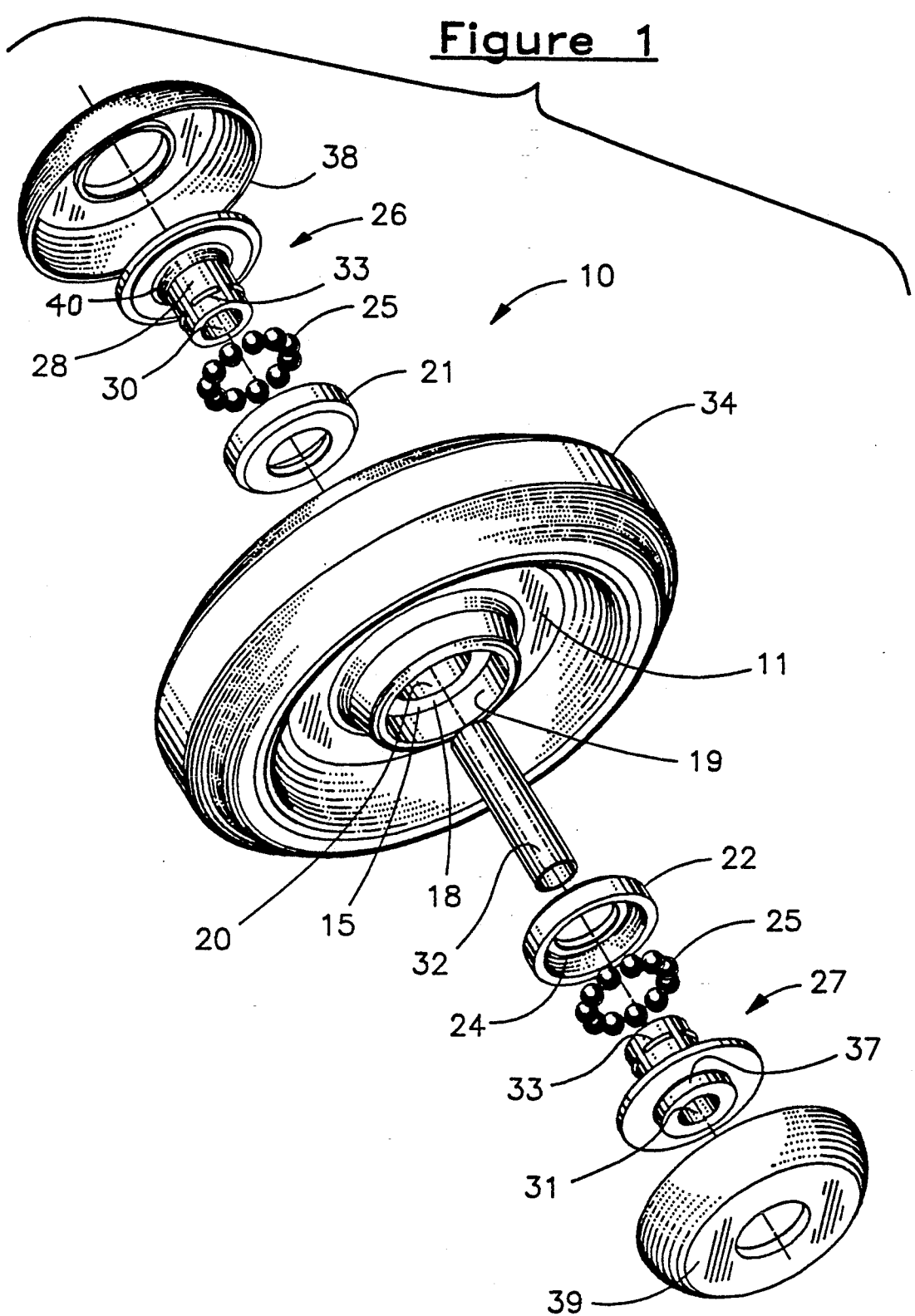
FIG. 1 is an exploded, perspective view of the improved shopping cart wheel of the present invention.

The improved shopping cart wheel is shown in perspective view in FIG. 1 and in cross-sectional view in FIG. 2 and indicated generally by reference character 10. Wheel 10 has a polymeric hub 11 which has a central bisecting plane 12 shown in FIG. 2 and a central axis of rotation 13 as shown best in FIG. 2. Hub 11 has a first bearing support cavity 14 and a second bearing support cavity 15. Cavity 14 has a vertical portion 16 and a cylindrical portion 17, and cavity 15 has a vertical portion 18 and a cylindrical portion 19. An Opening 20 surrounds the central axis of rotation 13. A tire 34 is cast over the outer peripheral surface 35 in a conventional manner.

A pair of female race members comprising female race member 21 and female race member 22 are held in the first and second bearing support cavities 14 and 15, respectively. The construction of the female race member is an important feature of the present invention and it should be made from a polymer with excellent impact resistance and toughness. It has been found that an acetal polymer is satisfactory for this purpose. The female race members include outwardly facing races 23 and 24, respectively. A plurality of ball bearings are adjacent the outwardly facing races 23 and 24. A pair of male race members 26 and 27 also form an important portion of the present invention. Male race member 26 has an inner, generally cylindrical support cylinder 28, and male race member 27 similarly has a support cylinder 29. Male race members 26 and 27 each have an inwardly facing bearing race 40. Preferably, as shown in FIG. 2, these support cylinders 28 and 29 abut one another to provide a stop against overtightening of the races against the ball bearings 25. Male race members 26 and 27 each have a cylindrical inner surface 30 and 31 which snugly fit over the outer surface of a cylindrical, metallic inner sleeve 32. The axle passes through the inner surface of this sleeve. The sleeve tends to align and support the male race members 26 and 27 and likewise prevents the overtightening of the male race members against the female race members. That is, when a yoke is placed over the wheel assembly and riveted in place, both the cylindrical, metallic inner sleeve 32 and assembly in any detrimental way. Male race members 26 and 27 have a thread guard supporting rings 36 and 37 which support thread guards 38 and 39.

Another important feature of the present invention is the material of construction of the male race members which should be fabricated from a polymer. The polymer should also be a tough, impact-resistant polymer, and it has been found that nylon is satisfactory for this use. It has also been found preferable that protrusions 33 be positioned on the outer surface of the support cylinders 28 and 29. This assists in the assembly of the unit whereby the female race can be snapped over the protrusions and held in place for later insertion into the bearing support cavities 14 and 15. The ball bearings 25, themselves, may be conventional steel ball bearings, but because the races are both polymeric, there will not be any squeaking as the ball bearings roll along the two polymeric races. The cylindrical, metallic inner sleeve 32 is preferably fabricated from steel so that it can provide maximum linear support and alignment of the male race members in addition to preventing undue pressure as set forth above. It has been found that wheels made according to the present invention will not require lubrication, will not rust, will be free wheeling and quiet and will last the life of the shopping cart wheel.

The particular combination of acetal female race members with nylon male race members provides an excellent combination of strength, economy, and grease resistance over a wide range of temperatures. They provide an absence of "slip-stick" together with excellent abrasion resistance.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved shopping cart wheel of the type having a hub with a central axis of rotation, a central bisecting plane and having an outer peripheral surface portion which supports a tire member and a bearing support cavity surrounding the central axis of rotation, wherein the improvement comprises:

an opening surrounding said central axis of rotation;

first and second bearing supporting cavities positioned symmetrically about said central axis of rotation and extending inwardly to form a pair of female race supporting steps;

a pair of female race members held by said female race supporting steps of said first and second bearing support cavities, said pair of female race members being fabricated from a polymer and each including an outwardly facing bearing race;

a plurality of ball bearings adjacent each of said outwardly facing bearing race surfaces of said pair of female race members;

a pair of male race members, each including an inwardly facing bearing race, each of said pair of male race members having an inner, generally cylindrical support cylinder which extends past the female race members toward the central bisecting plane of said hub and has a cylindrical inner surface, and extends away from said generally cylindrical support cylinder to form said inwardly facing bearing races, said pair of male race members being fabricated from a polymer; and a cylindrical, metallic, inner shaft supporting sleeve which supports said pair of male race members at the cylindrical inner surface of said generally cylindrical support cylinder.

2. The improved shopping cart wheel of claim 1 wherein said pair of female race members is fabricated from an acetal polymer.

3. The improved shopping cart wheel of claim 1 wherein said pair of male race members is fabricated from nylon.

4. The improved shopping cart wheel of claim 1 wherein said inner, generally cylindrical support cylinders of said pair of male race members extend to about the central bisecting plane of said hub.

5. A shopping cart wheel of the type having a hub with a central axis of rotation, a central bisecting plane and having an outer peripheral surface portion which supports a tire member, and a bearing support cavity surrounding the central axis of rotation, wherein the improvement comprises:

an opening surrounding said central axis of rotation;

first and second bearing supporting cavities positioned symmetrically bout said central axis of rotation and extending inwardly from a pair of female race supporting steps;

a pair of female race members held by said female race supporting steps of said first and second bearing support cavities, said pair of female race members being fabricated from a polymer and each including an outer bearing race;

a plurality of ball bearings adjacent each of said outer bearing races of said pair of female race members;

a pair of male race members, each including an inner bearing race, each of said pair of male race members having an inner, generally cylindrical support cylinder which extends past the female race members toward the central bisecting plane of said hub and has a cylindrical inner surface and an outer surface and extends away from said generally cylindrical support cylinder to form said inner bearing races, said pair of male race members being fabricated from a polymer and each of said generally cylindrical support cylinders having at least one protrusion on the outer surface thereof to hold a female race member in place thereon.

* * * * *